(12) United States Patent
Iwasaki

(10) Patent No.: US 10,676,044 B2
(45) Date of Patent: Jun. 9, 2020

(54) INTERIOR PART AND METHOD FOR MANUFACTURING THE SAME

(71) Applicant: TOYOTA BOSHOKU KABUSHIKI KAISHA, Aichi-ken (JP)

(72) Inventor: Hironobu Iwasaki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 124 days.

(21) Appl. No.: 15/704,818

(22) Filed: Sep. 14, 2017

(65) Prior Publication Data
US 2018/0079371 A1 Mar. 22, 2018

(30) Foreign Application Priority Data

Sep. 20, 2016 (JP) .................................. 2016-182962

(51) Int. Cl.
*B60R 13/02* (2006.01)
*D05B 23/00* (2006.01)
(Continued)

(52) U.S. Cl.
CPC .............. *B60R 13/02* (2013.01); *D05B 23/00* (2013.01); *B32B 3/263* (2013.01); *B32B 7/08* (2013.01);
(Continued)

(58) Field of Classification Search
CPC ..... Y10T 428/24033; Y10T 428/24041; Y10T 428/2405; B60R 13/02; B62D 65/14; B32B 7/08; B32B 3/263
See application file for complete search history.

(56) References Cited

U.S. PATENT DOCUMENTS

2006/0165939 A1* 7/2006 Hottner .................. A41D 27/24
428/57
2013/0048219 A1* 2/2013 Ferreiro ............... A41D 27/245
156/513
(Continued)

FOREIGN PATENT DOCUMENTS

JP 59-89248 5/1984
JP 2015-093601 5/2015
(Continued)

OTHER PUBLICATIONS

U.S. Appl. No. 15/704,847 to Hironobu Iwasaki et al., which was filed on Sep. 14, 2017.
(Continued)

*Primary Examiner* — Alexander S Thomas
(74) *Attorney, Agent, or Firm* — Greenblum & Bernstein, P.L.C.

(57) ABSTRACT

An interior part having high mechanical strength while having a stitch pattern penetrating a base-material layer is provided. A manufacturing method that improves strength of the base-material layer and enhances sewing compatability is also provided.
The interior part includes a skin layer joined to a base-material layer. The base-material layer includes reinforcing fibers and a thermoplastic resin. A thread sewn between the base-material layer and a design surface of the skin layer forms a stitch pattern provided on the design surface. A needle hole of the base-material layer is blocked at least at one of an opening on the base-material layer and a hole inside. The method includes shaping a fiber-reinforced board in which the thermoplastic resin is softened, and blocking at least one of the opening of the needle hole and the hole inside.

9 Claims, 7 Drawing Sheets

(51) Int. Cl.
   *B32B 3/26* (2006.01)
   *B32B 7/08* (2019.01)
(52) U.S. Cl.
   CPC ... *B60Y 2410/122* (2013.01); *Y10T 428/2405* (2015.01); *Y10T 428/24033* (2015.01); *Y10T 428/24041* (2015.01)

(56) References Cited

U.S. PATENT DOCUMENTS

2015/0130204 A1   5/2015   Takezawa et al.
2015/0202839 A1   7/2015   Kawashima

FOREIGN PATENT DOCUMENTS

| JP | 2015-136827 | 7/2015 |
| JP | 2015-160484 | 9/2015 |
| WO | 2006/001067 | 1/2006 |

OTHER PUBLICATIONS

Japan Office Action, Japan Patent Office, Application No. 2016-182962, dated Mar. 17, 2020, with English machine translation.

\* cited by examiner

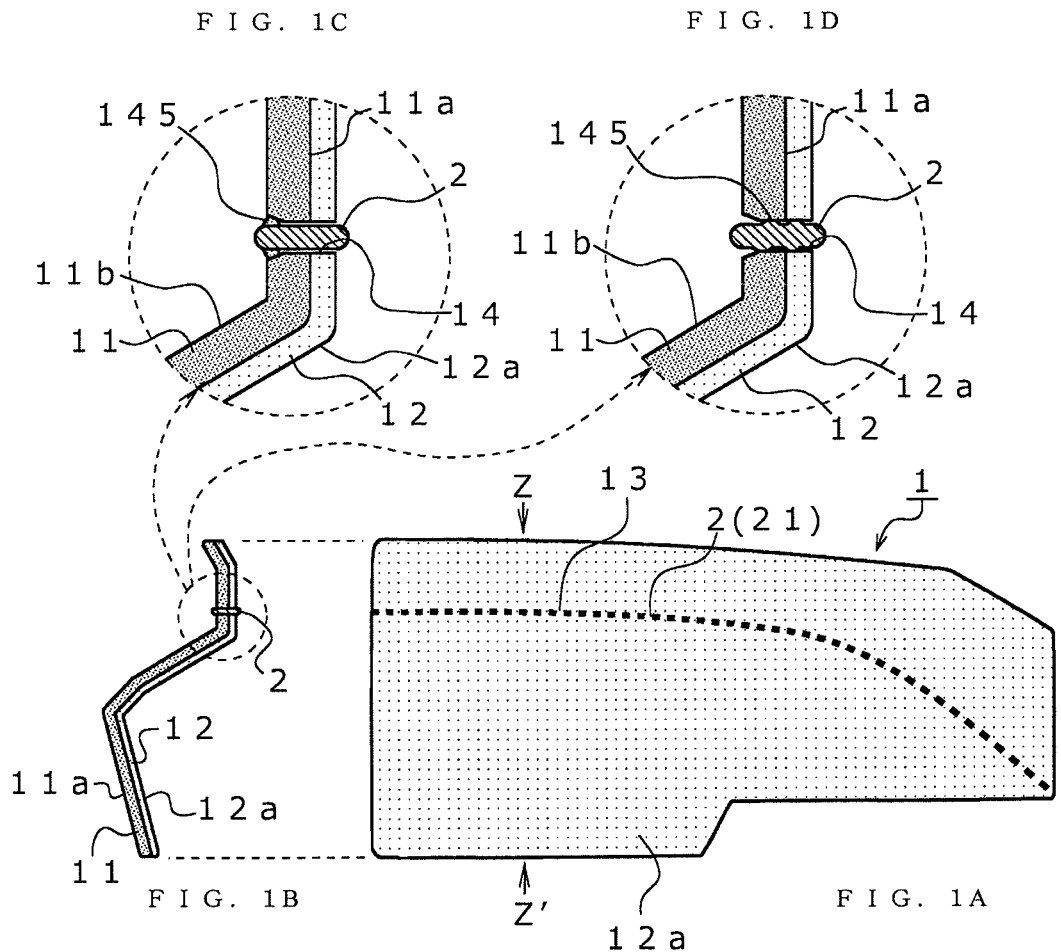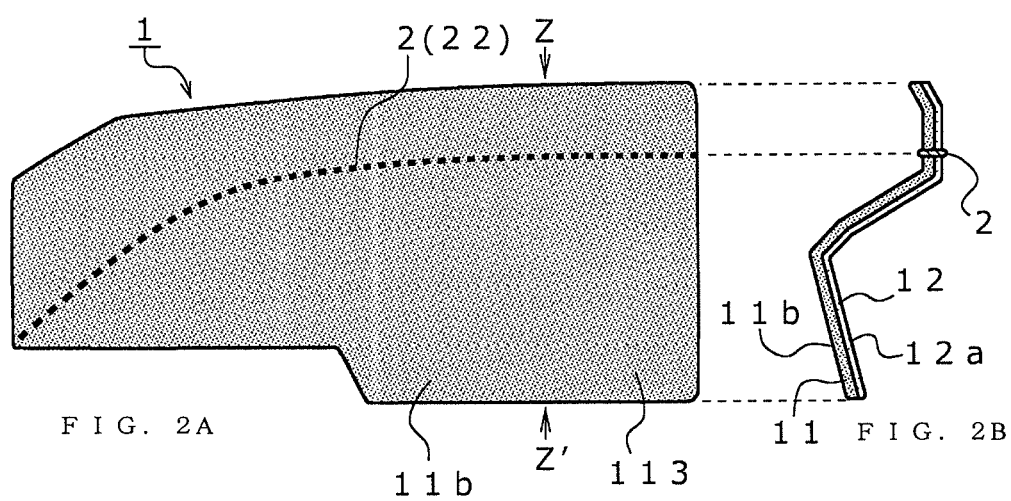

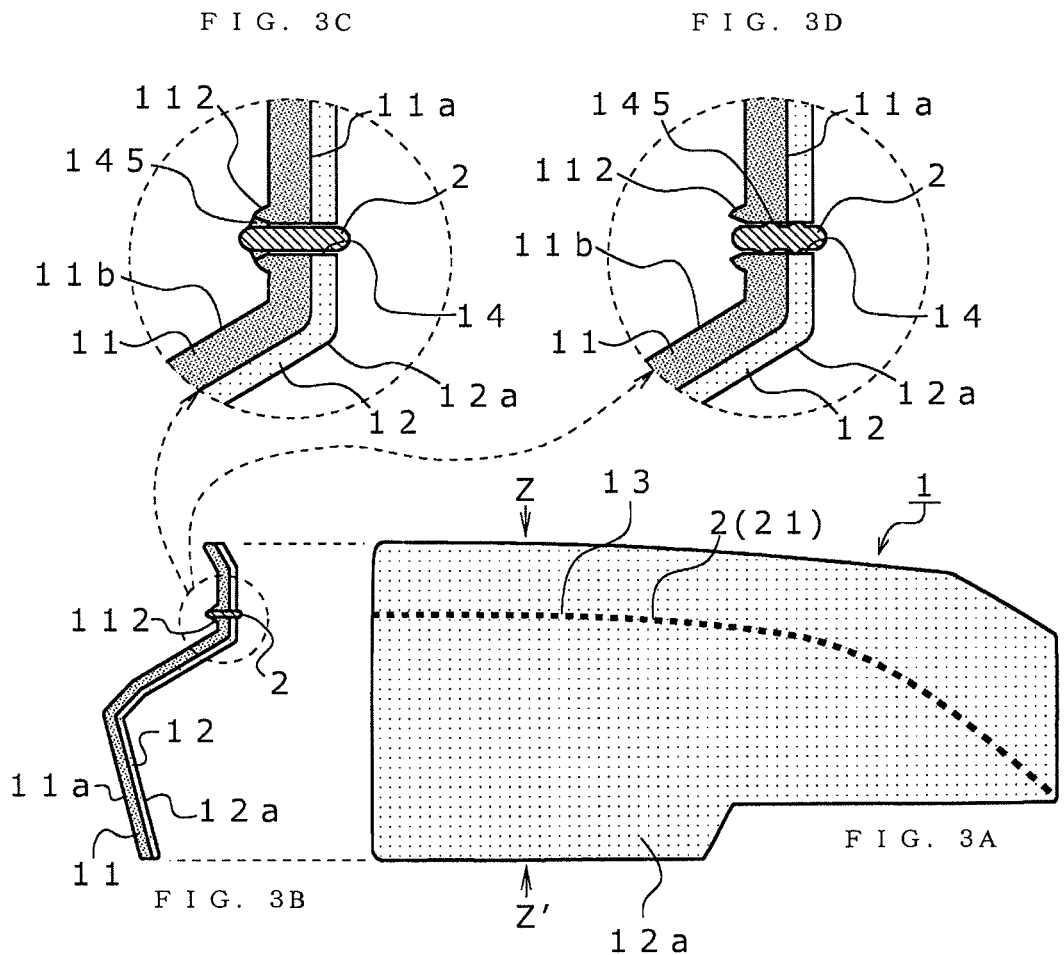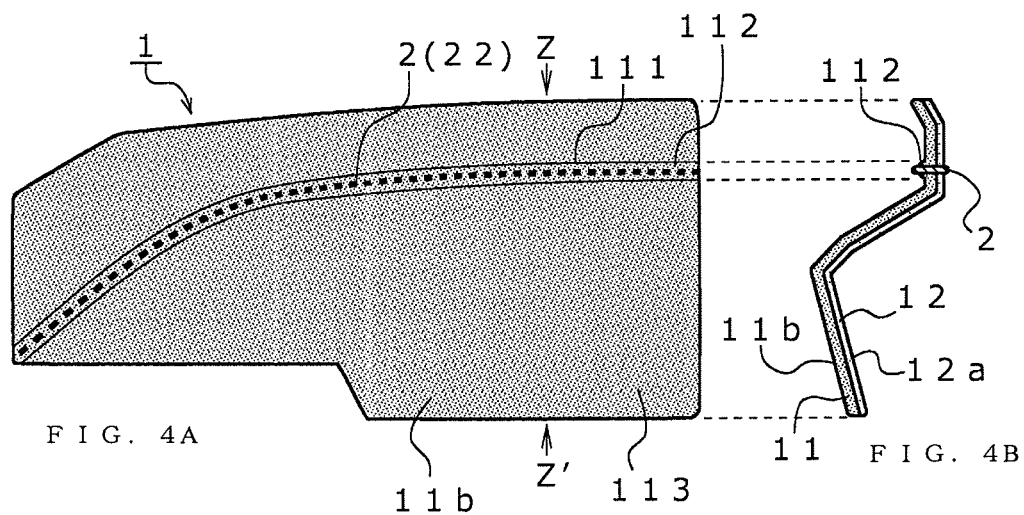

INTERIOR PART AND METHOD FOR MANUFACTURING THE SAME

CROSS-REFERENCE TO RELATED APPLICATIONS

The present application claims priority under 35 U.S.C. § 119 of Japanese Patent Application No. 2016-182962, filed on Sep. 20, 2016, the disclosure of which is expressly incorporated by reference herein in its entirety.

BACKGROUND

Technical Field

The present invention relates to an interior part and a method for manufacturing the same. More specifically, the present invention relates to an interior part obtained by bonding a base body and a skin together, and method for manufacturing the same.

Related Art

On a design surface of an interior part including a skin such as a door trim or an instrument panel, a stitch pattern like line stitch can be provided by sewing. Thus, it is possible to impart a design that cannot be expressed by only the pattern of the skin, and it is possible to exhibit a higher design property. From such a viewpoint, attempts have been made to provide a stitch pattern by various methods. The interior part is obtained by forming in advance a laminate in which a skin layer and a shaped base-material layer are laminated, and performing sewing with a sewing needle such that the sewing needle penetrates through the front and back surfaces of the laminate to form a stitch pattern on the design surface of the skin layer. (see JP 2015-160484 A and JP 2015-093601 A).

SUMMARY

The interior parts manufactured as disclosed in the above-described JP 2015-160484 A and JP 2015-093601 A are advantageous in that deformation of the stitch pattern can be prevented. For example, when a skin layer provided with a stitch pattern in advance is to be joined to a base-material layer which has been shaped by imparting an uneven shape or the like, there is a problem that a portion where the skin layer extends greater and a portion where the skin layer extends less mixedly exist according to the uneven shape imparted to the base-material layer, and the design of the stitch pattern deforms. In contrast, as described above, the stitch pattern formed by making the sewing needle penetrate the front and back of the laminate obtained by laminating the shaped base-material layer and the skin layer in advance is superior in that the design shape can be maintained.

JP 2015-160484 A and JP 2015-093601 A disclose that sewing can be more easily performed by decreasing the thickness of the portion of the base-material layer where the sewing needle penetrates upon sewing. That is, JP 2015-160484 A discloses a method in which a thin portion 7 (stitch formation area) thinner than the periphery is formed, on a base member 4 (paragraphs [0029] to [0030]). In contrast, JP 2015-093601 A discloses that by forming a recess 521, the thickness of a sewn portion 53 which is a bottom wall portion of the recess 521 becomes thinner than the periphery, and a stitch thread 41 can be easily sewn (paragraph [0045]).

However, since the base-material layer supports the skin layer and determines the strength of the interior part, it is necessary to have sufficient strength even if the thickness is made thin. Therefore, the base-material layer cannot be made excessively thin only from the viewpoint of ease of sewing. In addition, in order to perform sewing by penetrating a hard base-material layer having high strength with a sewing needle, it is necessary to perform sewing using a sufficiently thick sewing needle with a high sewing pressure. However, there is a problem that if the sewing needle is made thicker, the resistance generated when the sewing needle penetrates the base layer becomes greater and wear of the sewing needle also increases. If wear of the sewing needle increases, it is necessary to increase the number of times to stop operation of a sewing machine and exchange sewing needles, which is not preferable from the viewpoint of production efficiency. That is, there is a problem that it is still difficult to balance such various conditions with each other so as to facilitate sewing.

The present invention has been made in view of the above problem, and an object of the present invention is to provide an interior part capable of having a high mechanical strength while having a stitch pattern penetrating a base-material layer. Furthermore, an object of the present invention is to provide a method for manufacturing an interior part capable of making improvement in strength of a base-material layer and ease of sewing compatible at a high level.

[1] According to a non-limiting embodiment of the present application an interior part includes a base-material layer and a skin layer joined to one surface of the base-material layer, the base-material layer includes reinforcing fibers, and a first thermoplastic resin binding the reinforcing fibers together, a thread sewn between an opposite surface of the base-material layer with respect to the one surface and a design surface of the skin layer forms a stitch pattern provided on the design surface, and a needle hole through which the thread is inserted and which is formed in the base-material layer is blocked at least at one of an opening of the needle hole on the opposite surface of the base-material layer and a hole inside of the needle hole.

[2] According to a non-limiting embodiment the needle hole is blocked at the opening on the opposite surface of the base-material layer, and a blocking portion which blocks the needle hole is obtained by burying a burr into the opening of the needle hole, the burr being generated on the opposite surface of the base-material layer when the sewing needle penetrates the base-material layer upon sewing.

[3] According to a non-limiting embodiment the thread includes a second thermoplastic resin, the needle hole is blocked at the hole inside, and a blocking portion which blocks the needle hole is obtained by melting and solidifying the second thermoplastic resin at the hole inside.

[4] According to a non-limiting embodiment a sewn area of the base-material layer is thicker than a periphery of the sewn area.

[5] According to a non-limiting embodiment a sewn area of the base-material layer is thicker than a periphery of the sewn area.

[6] According to a non-limiting embodiment a sewn area of the base-material layer is thicker than a periphery of the sewn area.

[7] According to a non-limiting embodiment a method for manufacturing the interior part includes:

heating a fiber-reinforced board obtained by including the reinforcing fibers and the first thermoplastic resin and being compressed, and softening the first thermoplastic resin;

shaping the fiber-reinforced board in which the first thermoplastic resin is softened;

forming a laminate which includes the base-material layer which has been shaped and the skin layer joined to the one surface of the base-material layer by joining the skin layer to one surface of the fiber-reinforced board at one of timings simultaneous with and after the shaping of the fiber-reinforced board;

forming a stitch pattern by performing sewing between the opposite surface of the base-material layer and the design surface of the skin layer; and blocking a needle hole formed by penetration of a sewing needle at least at one of the opening of the needle hole on the opposite surface of the base-material layer and a hole inside of the needle hole.

[8] According to a non-limiting embodiment the method includes:

heating a fiber-reinforced board obtained by including the reinforcing fibers and the first thermoplastic resin and being compressed to soften the first thermoplastic resin;

shaping the fiber-reinforced board in which the first thermoplastic resin is softened;

forming a laminate which includes the base-material layer which has been shaped the skin layer joined to the one surface of the base-material layer by joining the skin layer to one surface of the fiber-reinforced board at one of timings simultaneous with and after the shaping of the fiber-reinforced board;

forming a stitch pattern by performing sewing between the opposite surface of the base-material layer and the design surface of the skin layer; and blocking the needle hole formed by penetration of the sewing needle at the opening on the opposite surface of the base-material layer, and in the blocking, a burr is buried into the opening of the needle hole by heating and softening the burr generated on the opposite surface of the base-material layer when the sewing needle penetrates the base-material layer in the forming the sewing pattern.

[9] According to a non-limiting embodiment the method includes:

heating a fiber-reinforced board obtained by including the reinforcing fibers and the first thermoplastic resin and being compressed to soften the first thermoplastic resin;

shaping the fiber-reinforced board in which the first thermoplastic resin is softened;

forming a laminate which includes the base-material layer which has been shaped and the skin layer joined to the one surface of the base-material layer by joining the skin layer to one surface of the fiber-reinforced board at one of timings simultaneous with and after the shaping of the fiber-reinforced board;

forming a stitch pattern by performing sewing with the thread including the second thermoplastic resin between the opposite surface of the base-material layer and the design surface of the skin layer; and blocking a hole inside of the needle hole formed by penetration of a sewing needle, and in the blocking, the second thermoplastic resin is melted and solidified at the hole inside.

[10] According to a non-limiting embodiment the method includes:

heating a fiber-reinforced board obtained by including the reinforcing fibers and the first thermoplastic resin and being compressed to soften the first thermoplastic resin;

shaping the fiber-reinforced board in which the first thermoplastic resin is softened and forming an area to be sewn thicker than a periphery of the area to be sewn by releasing compression;

forming a laminate which includes the base-material layer which has been shaped and the skin layer joined to the one surface of the base-material layer by joining the skin layer on one surface of the fiber-reinforced board at one of timings simultaneous with and after the shaping of the fiber-reinforced board;

forming a stitch pattern by performing sewing between the opposite surface of the base-material layer and the design surface of the skin layer such that a sewing needle penetrates the area to be sewn; and blocking the needle hole formed by penetration of the sewing needle at least at one of the opening of the needle hole on the opposite surface of the base-material layer and a hole inside of the needle hole.

An interior part 1 of the present invention includes a base-material layer 11, and a skin layer 12 joined to one surface 11a of the base-material layer 11. Among them, the base-material layer 11 includes reinforcing fibers, and a first thermoplastic resin binding the reinforcing fibers together. The interior part 1 includes a stitch pattern 13 formed on a design surface 12a of the skin layer 12 with a thread 2 sewn between an opposite surface 11b of the base-material layer 11 with respect to the one surface 11a and the design surface 12a. A needle hole into which a thread 2 is inserted and which is formed in the base-material layer 11 is blocked at least at one of an opening 141 of the needle hole 14, the opening 141 being formed on the opposite surface 11b of the base-material layer 11, and a hole inside 142 of the needle hole 14.

Thus, the interior part 1 has the stitch pattern 13 which is formed with the thread 2 penetrating the base-material layer 11 and which has a high design property. In addition, mechanical strength of an area 111 where the stitch pattern 13 is sewn can be improved more than mechanical strength before sewing (that is, without the stitch pattern 13).

In addition, in a case where the sewn area 111 of the base-material layer 11 is thicker than the periphery, density of the thick area 111 to be sewn (to which the stitch pattern 13 formed by sewing is provided and will be the sewn area 111) is reduced, and the area 111 to be sewn has mechanical strength higher than that of a periphery 113 due to an increase in thickness. Therefore, even though the area 111 to be sewn has the stitch pattern 13, the area 111 to be sewn has higher mechanical strength than that of the periphery 113.

Furthermore, since the area 111 to be sewn has density lower than that of the periphery 113 due to the increase in thickness, a sewing needle can more easily penetrate the area 111. Therefore, wear of the sewing needle can be suppressed, and the interior part 1 can be efficiently manufactured while making the thread 2 penetrate the base-material layer 11. Therefore, the interior part 1 including the stitch pattern 13 with a high design property and manufactured at a low cost is provided.

A method for manufacturing the interior part 1 according to the present invention includes:

a heating step of heating a fiber-reinforced board obtained by including the reinforcing fibers and the first thermoplastic resin and being compressed to soften the first thermoplastic resin;

a shaping step of shaping the fiber-reinforced board in which the first thermoplastic resin is softened;

a laminate forming step of forming a laminate which includes the base-material layer 11 and the skin layer 12 joined to the one surface 11a of the base-material layer 11 by joining the skin layer 12 to one surface of the fiber-reinforced board simultaneously with or after the shaping step;

a stitch pattern forming step of forming a stitch pattern 13 by performing sewing between the opposite surface 11b of the base-material layer 11 and the design surface 12a of the skin layer 12; and a blocking step of blocking the needle hole 14 formed by penetration of the sewing needle at least at one of the opening 141 on the opposite surface 11b of the base-material layer 11 and the hole inside 142 of the needle hole 14.

Thus, the interior part 1 has the stitch pattern 13 which is formed with the thread 2 penetrating the base-material layer 11 and which has a high design property. In addition, mechanical strength of the area 111 where the stitch pattern 13 is sewn can be improved more than mechanical strength before sewing (that is, without the stitch pattern 13).

In a case where the fiber-reinforced board in which the first thermoplastic resin is softened is shaped and the area 111 to be sewn thicker than the periphery is formed by releasing compression in the shaping step, the mechanical strength of the sewn area 111 can be further improved. In addition, by performing shaping while forming the area 111 to be sewn thicker than the periphery, it is possible to form the area 111 to be sewn which is thicker but lower in density than the periphery 113 and which a sewing needle can more easily penetrate can be formed. Therefore, wear of the sewing needle can be suppressed, and the interior part 1 having the stitch pattern 13 with a high design property can be manufactured efficiently.

BRIEF DESCRIPTION OF DRAWINGS

The present invention will be further described in the following detailed description with reference to a plurality of mentioned drawings, by giving non-limiting examples of exemplary embodiments according to the present invention. Like reference numerals denote like portions throughout several drawings.

FIGS. 1A to 1D are a plan view (a design surface 12a side of a skin layer 12) and cross-sectional views schematically illustrating one example of an interior part according to the present invention.

FIGS. 2A and 2B are a plan view (an opposite surface 11b side of a base-material layer 11) and a cross-sectional view schematically illustrating the one example of the interior part according to the present invention.

FIGS. 3A to 3D are a plan view (a design surface 12a side of a skin layer 12) and cross-sectional views schematically illustrating another example of the interior part according to the present invention.

FIGS. 4A and 4B are a plan view (an opposite surface 11b side of a base-material layer 11) and a cross-sectional view schematically illustrating the other example of the interior part according to the present invention.

DETAILED DESCRIPTION

Figure 5:
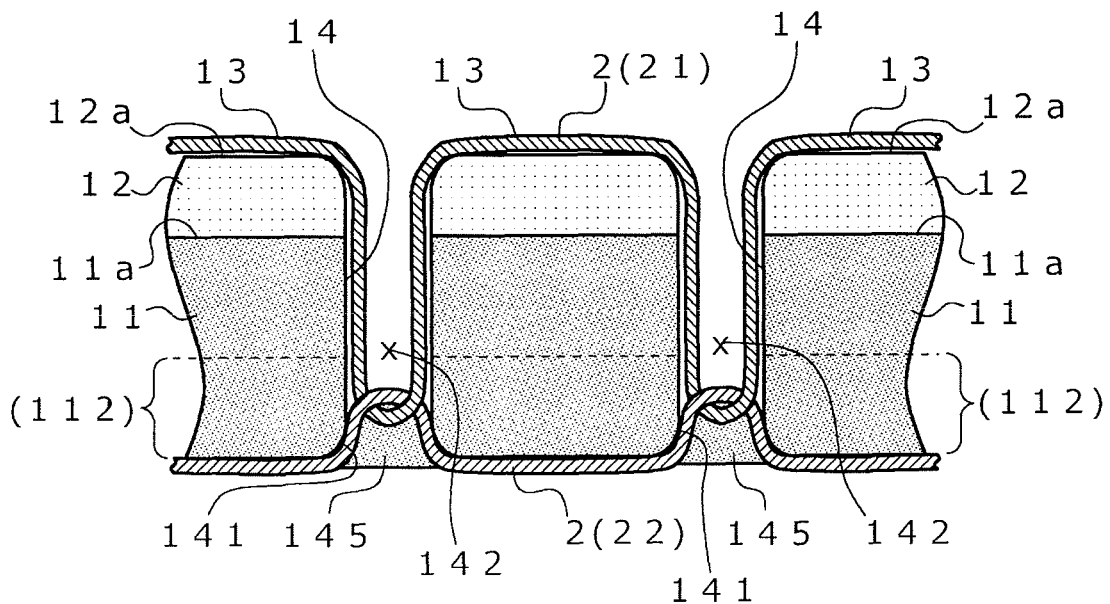
FIG. 5 is a partial cross-sectional view schematically illustrating one example of the interior part according to the present invention.
Figure 6:
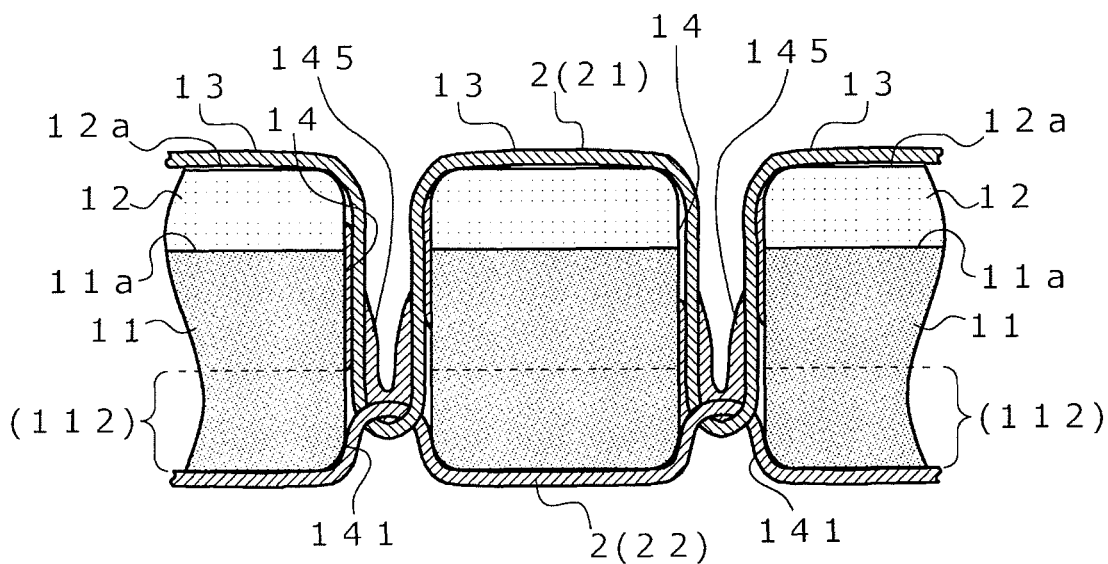
FIG. 6 is a partial cross-sectional view schematically illustrating another example of the interior part according to the present invention.

It is to be understood that the matters set forth herein are intended to be illustrative only and to exemplify embodiments of the present invention, and are described in order to explain the principles and conceptual features of the present invention in a most effective and most easy-to-understand way. In this respect, it is not intended to present the structural details of the present invention to the extent more than necessary for a fundamental understanding of the present invention but is intended to clarify to the person skilled in the art how some embodiments of the present invention are actually realized, by explanation in conjunction with the drawings.

[1] Interior Part

Hereinafter, embodiments of the present invention will be described with reference to the drawings.

An interior part (1) according to the present invention (see FIG. 1A to FIG. 6) is the interior part (1) including a base-material layer (11), and a skin layer (12) joined to one surface (11a) of the base-material layer (11).

The base-material layer (11) includes reinforcing fibers and a thermoplastic resin binding the reinforcing fibers together.

A thread (2) sewn between an opposite surface (11b) of the base-material layer (11) with respect to the one surface (11a) and a design surface (12a) of the skin layer (12) forms a stitch pattern (13) provided on the design surface (12a).

A needle hole (14) into which the thread (2) is inserted and which is formed in the base-material layer (11) is blocked at least at one of an opening (141) of the needle hole (14) on the opposite surface (11a) of the base-material layer (11) and a hole inside (142) of the needle hole (14).

Note that FIGS. 1A and 3A are plan views of the skin layer 12 on a design surface 12a side. In addition, FIGS. 1B and 3B are cross-sectional views taken along line Z-Z' in FIGS. 1A and 3A, respectively. Furthermore, FIGS. 1C and 3C are partially enlarged views illustrating the vicinity of the needle hole 14 in an enlarged manner, and illustrating as examples modes in which the needle hole 14 is blocked at the opening 141 of the needle hole 14. In addition, FIGS. 1D and 3D are partially enlarged views illustrating the vicinity of the needle hole 14 in an enlarged manner, and illustrating as examples modes in which the needle hole 14 is blocked at the hole inside 142 of the needle hole 14.

In contrast, FIGS. 2A and 4A are plan views on an opposite surface 11b side of the base-material layer 11. In addition, FIGS. 2B and 4B are cross-sectional views taken along line Z-Z' in FIGS. 2A and 4A, respectively.

The interior part 1 illustrated in FIGS. 3A to 4B differ from the interior part 1 illustrated in FIGS. 1A to 2B in that a sewn area 111 is thicker than the periphery. That is, the interior part 1 illustrated in FIGS. 3A to 4B includes a thick portion 112.

The base-material layer 11 has a plate shape. That is, the base-material layer 11 is a layer having a substantially uniform thickness as a whole. In addition, the base-material layer 11 is usually shaped so as to have an uneven shape.

The base-material layer 11 includes reinforcing fibers and a first thermoplastic resin binding the reinforcing fibers together. In addition, the base-material layer 11 is preferably a layer formed by softening the first thermoplastic resin in a pre-board (precursor of the base-material layer) in which the reinforcing fibers and first thermoplastic resin fibers are compressed collectively. In the base-material layer 11 as described above, when a portion having a small thickness and a portion having a large thickness are compared to each other, the density of the portion having a larger thickness can be made lower than the density of the portion having a smaller thickness.

The above-described pre-board is obtained by mixing the reinforcing fibers and first thermoplastic resin fibers which are obtained by forming the first thermoplastic resin into fiber shapes and which are to be used to bind the reinforcing fibers together (mixing the fibers), and compressing the mixed fibers into a plate shape. The pre-board usually has a flat shape. The base-material layer 11 is obtained by heating the pre-board, softening the first thermoplastic resin contained in the pre-board, and then imparting the above-described uneven shape by cold pressing. In the base-material layer 11 thus obtained, restraint of the reinforcing fibers by the first thermoplastic resin (first thermoplastic resin fibers) solidified in the pre-board is relaxed by spring-back action of the reinforcing fibers, and the base-material layer 11 is shaped to be thicker as a whole than the initial thickness of the pre-board. Therefore, the density of a portion with a larger thickness can be made lower than the density of a portion with a smaller thickness.

The interior part 1 has the needle hole 14 blocked by at least one of the opening 141 on the opposite surface 11b of the base-material layer 11 and the hole inside 142 in the needle hole 14. The stitch pattern 13 is formed by the thread 2 sewn between the opposite surface 11b of the base-material layer 11 and the design surface 12a of the skin layer 12. When the stitch pattern 13 is provided, a sewing needle with the thread 2 penetrates the opposite surface 11b of the base-material layer 11 and the design surface 12a of the skin layer 12 to form a needle hole 14' (needle hole before being blocked). Therefore, the needle hole 14' before being blocked penetrates the opposite surface 11b of the base-material layer 11 and the design surface 12a of the skin layer 12. Then, the needle hole 14' before being blocked is blocked at least at one of the opening 141 and the hole inside 142, and becomes the needle hole 14 after being blocked.

Note that in this specification, since it is troublesome to distinguish the needle hole 14' before being blocked and the needle hole 14 after being blocked from each other, the needle hole 14' and the needle hole 14 are collectively referred to as the needle hole 14 without being distinguished from each other except when necessary.

Since the needle hole 14 is blocked, strength of the interior part 1 can be increased than that in the case where the needle hole 14 is not blocked. That is, usually, when the stitch pattern 13 is provided on the interior part 1, penetrating needle holes are formed along the stitch pattern 13. For example, in an interior part having line stitch as the stitch pattern 13, needle holes formed along the line stitch upon sewing of the thread 2 are intermittently arranged. Therefore, when the needle hole becomes a break starting point, a line with low mechanical strength may be formed along the stitch line.

However, according to the present invention, for example, even in a case where line stitch is formed as the stitch pattern 13 on the interior part 1, it is possible to obtain higher mechanical strength than that in a case where only the stitch pattern 13 is provided, and mechanical strength higher than that before the stitch pattern 13 is provided can be obtained. In other words, by providing the stitch pattern 13, it is possible to improve mechanical strength of the interior part 1.

Furthermore, when plant fibers are used as the reinforcing fibers of the base-material layer 11, the needle hole 14 (opening diameter of a through hole) tends to be larger than that in a case where other fibers are used as the reinforcing fibers, and strength may be lowered more. However, even in such a case, by providing the stitch pattern 13 in the interior part 1, it is possible to increase mechanical strength of the interior part 1 more than in the case where the stitch pattern 13 is not provided.

Figure 7:
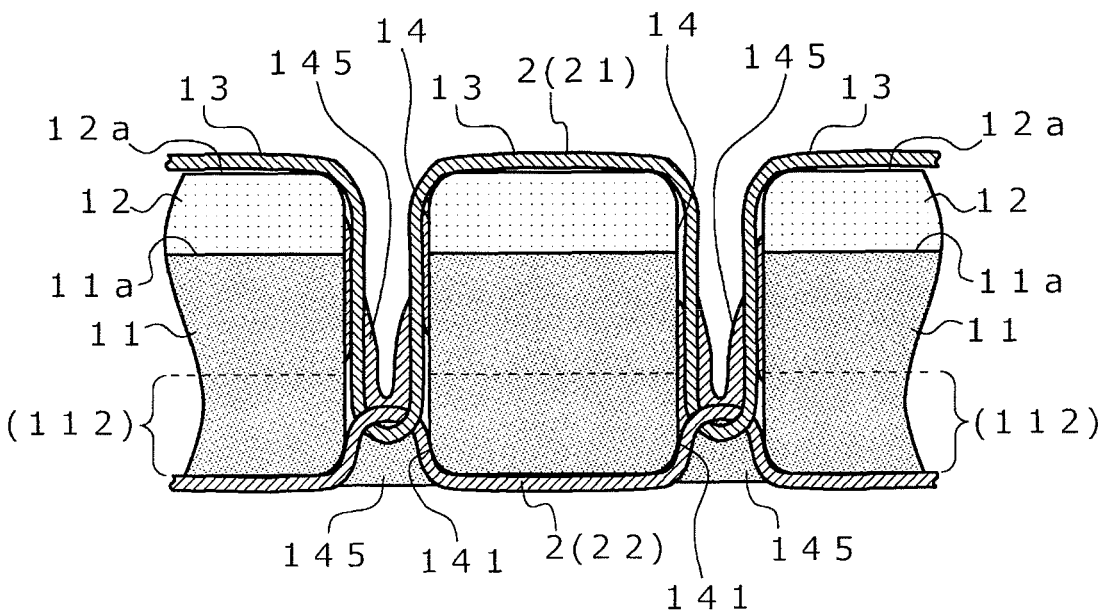
FIG. 7 is a partial cross-sectional view schematically illustrating yet another example of the interior part of the present invention.

The needle hole 14 may be blocked in any way and may be blocked at a location other than the opening 141 and the hole inside 142. However, it is preferable that the needle hole 14 be blocked at least at one of the opening 141 and the hole inside 142 (see FIGS. 5 to 7).

In the above cases, in the case where the thread hole 14 is blocked at the opening 141 (see FIG. 5), a blocking portion 145 blocking the needle hole 14 is preferably a blocking portion 145 obtained by burying a burr into the opening 141 of the needle hole 14, the burr being generated on the opposite surface 11b of the base-material layer 11 when a sewing needle penetrates the base-material layer 11 upon sewing.

As described above, the burr is formed by the sewing needle penetrating the base-material layer 11 upon sewing. Therefore, for example, the burr is formed so as to protrude on the opposite surface 11b when the sewing needle is inserted from the one surface 11a of the base-material layer 11 toward the opposite surface 11b, or when the sewing needle is inserted into the base-material layer 11 and then pulled out from the opposite surface 11b toward the one surface 11a.

The size, the shape, and the like of the burr are not particularly limited; however, the burr is part of the base-material layer 11 and includes the reinforcing fibers and the first thermoplastic resin constituting the base-material layer 11. Normally, even if the burr protrudes on the opposite surface 11b, part of the burr is connected to the base-material layer 11.

When the burr described above is buried into the opening 141 and is heated, the first thermoplastic resin constituting the burr and the opening 141 is melted and then solidified to form the blocking portion 145 inside the opening 141. Since the first thermoplastic resin is melted and solidified in formation of the blocking portion 145 as described above, the opening 141 and the blocking portion 145 are integrally joined via the first thermoplastic resin.

Therefore, in the present invention, the blocking portion 145 which is obtained by burying the burr formed on the opposite surface 11b into the opening 141 of the needle hole 14 blocks the opening 141 of the needle hole 14 on the opposite surface 11b. The blocking portion 145 contains the reinforcing fibers and the first thermoplastic resin identical to those contained in the base-material layer 11, and is integrated with the opening 141 of the needle hole 14 on the opposite surface 11b of the base-material layer 11.

However, the blocked state by the blocking portion 145 is not particularly limited. For example, the needle hole 14 may be blocked to such an extent that passage of light and ventilation are not blocked between the openings of the needle hole 14 on the opposite surface 11b and the one surface 11a, may be blocked to such an extent that the passage of light is blocked but ventilation is not interrupted, or may be blocked such that both light passage and ventilation are blocked.

In contrast, in a case where the needle hole 14 is blocked at the hole inside 142 (see FIG. 6), the blocking portion 145 blocking the needle hole 14 is preferably obtained by melting and solidifying a second thermoplastic resin at the hole inside 142, the second thermoplastic resin being contained in the thread 2. That is, by previously blending the second thermoplastic resin with the thread 2 before sewing, the blocking portion 145 can be formed at the hole inside 142 by melting and solidifying part of the thread 2 after sewing.

In this case, the first thermoplastic resin and the second thermoplastic resin may be an identical thermoplastic resin or different thermoplastic resins. More specifically, the first thermoplastic resin and the second thermoplastic resin may have an identical composition or may have different compositions. In addition, the first thermoplastic resin and the second thermoplastic resin may have an identical composition but have different melting points (melting start temperatures in a case where the melting points are unknown). In particular, assuming that the melting point of the first thermoplastic resin (melting start temperature in a case where the melting point is unknown) is $T_1$ and the melting point of the second thermoplastic resin (melting start temperature in a case where the melting point is unknown) is $T_2$, it is preferable to satisfy $-20 \leq T_1-T_2 \leq 35$, and it is more preferable to satisfy $5 \leq T_1-T_2 \leq 35$. In particular, in a case where $-20 \leq T_1-T_2 \leq 35$ is satisfied, in particular, $-10 \leq T_1-T_2 \leq 10$ is satisfied, it is possible to melt the first thermoplastic resin and the second thermoplastic resin together. Therefore, it is possible to fuse the first thermoplastic resin constituting the base-material layer 11 and the second thermoplastic resin constituting the thread 2 at the hole inside 142. In this case, it is possible to obtain the blocking portion 145 in which the first thermoplastic resin and the second thermoplastic resin are melted together.

In addition, in a case where $5 \leq T_1-T_2 \leq 35$ is satisfied, in particular, $10 \leq T_1-T_2 \leq 35$ is satisfied, it is possible to melt only the second thermoplastic resin without melting the first thermoplastic resin. Therefore, only the second thermoplastic resin constituting the thread 2 can be melted at the hole inside 142 without affecting the base-material layer 11.

In these modes, the material constituting the thread 2 other than the second thermoplastic resin constituting the thread 2 is normally kept in the blocking portion 145 while maintaining the shape without being melted. The second thermoplastic resin is melted and fused to an inner wall of the hole inside 142, and therefore the blocking portion 145 which blocks the hole inside 142 can be formed.

Furthermore, as described above, stronger blocking can be realized by performing blocking caused by burying the burr into the hole and blocking achieved by melting and solidification of the second thermoplastic resin contained in the thread 2. That is, the needle hole 14 (FIG. 7) can be obtained which includes both the blocking portion 145 in which the burr formed on the opposite surface 11b of the base-material layer 11 is buried in the opening 141 of the needle hole 14, and the blocking portion 145 in which the second thermoplastic resin is melted and solidified at the hole inside 142.

Furthermore, in addition to the above, for example, a separate thermoplastic resin sheet is positioned along arrangement of the needle holes 14 on the opposite surface 11b formed by sewing, and the thermoplastic resin sheet is melted. Thus, the opening 141 of the needle hole 14 can be blocked. In the case of using the thermoplastic resin sheet as described above, it is possible to perform blocking together with burying of the burr into the needle hole as described above. The thermoplastic resin constituting the thermoplastic resin sheet is not limited; however, the second thermoplastic resin constituting the above-described thread 2 can be applied as it is.

In addition, in the interior part 1, the sewn area 111 of the base-material layer 11 can be made thicker than the periphery. That is, it is possible to provide the interior part 1 which includes the thick portion 112 formed to be thicker than the periphery, and the needle hole 14 penetrating the thick portion 112, the needle hole 14 being blocked. As described above, the interior part 1 having higher mechanical strength can be obtained in a case where the needle hole 14 is provided in the thick portion 112 and furthermore the needle hole 14 is blocked, than in a case where the thick portion 112 is not provided.

Furthermore, the density of the thick area 111 to be sewn is lower than that in the periphery. In other words, the density of the thick portion 112 (the sewn area 111) is lower than the non-thick portion in the periphery. Therefore, when the interior part 1 is manufactured, the sewing needle can more easily penetrate the base-material layer 11, and wear of the sewing needle can be suppressed. Since wear of the sewing needle can be suppressed, the number of times to replace sewing needles attached to a sewing machine can be reduced, and production efficiency can be improved. That is, it is possible to efficiently manufacture the interior part 1 including the stitch pattern 13 obtained by making the thread 2 penetrate the base-material layer 11 and having improved mechanical strength. Therefore, the interior part 1 including the stitch pattern 13 with a high design property and manufactured at a low cost can be provided.

In the area 111 to be sewn, sewing may be performed after preparatory holes are provided; however, normally preparatory holes are not necessary. That is, the sewing needle can be made to pass through without forming a preparatory hole for the needle to pass through.

Difference in density between the thick area 111 to be sewn and the periphery 113 is not specifically limited. For example, assuming that the density of the thick portion (the sewn area 111) is X ($g/cm^3$) and the density of the non-thick portion (the periphery 113 of the sewn area 111) is Y ($g/cm^3$), X and Y may be any as long as $X/Y<1$ is satisfied, $0.50 \leq X/Y \leq 0.95$ is preferably satisfied, $0.55 \leq X/Y \leq 0.90$ is more preferably satisfied, $0.60 \leq X/Y \leq 0.85$ is particularly satisfied, and $0.65 \leq X/Y \leq 0.80$ is most preferably satisfied.

Specific ranges of the density X ($g/cm^3$) and the density Y ($g/cm^3$) are not particularly limited; however, for example, the density Y ($g/cm^3$) can be set to $0.30 \leq Y \leq 0.90$, $0.33 \leq Y \leq 0.86$ is preferable, $0.37 \leq Y \leq 0.83$ is more preferable, and $0.40 \leq Y \leq 0.80$ is particularly preferable.

Note that the density can be measured by the following method. That is, a measurement piece having a predetermined size for density measurement is cut out from each of the non-thick portion (the periphery 113 of the sewn area 111) and the thick portion 112, and the measurement pieces are used to measure the density. Length (L), width (W), and thickness (D) for density measurement are measured (a caliper and/or a micrometer can be used). For each of the length, the width, and the thickness for density calculation, an average value of values measured at five different randomly selected spots is used. In addition, the measurement piece the above-described length, width, and thickness of which have been measured is used to obtain a weight (S) for density measurement. The average value of the weight values obtained in measurement performed five times (an electronic scale can be used) is used as the weight (S). It is assumed that the value calculated by S/(L×W×D) based on these measured values is the above density.

Figure 8:
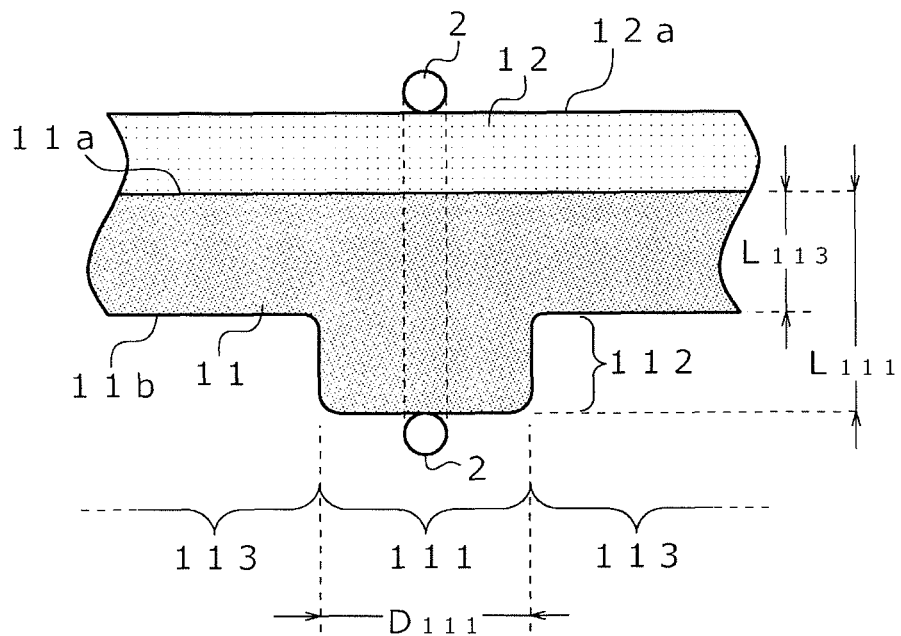
FIG. 8 is a partial cross-sectional view schematically illustrating an example of the interior part according to the present invention.

The specific thickness of the area 111 to be sewn provided with the thick portion 112 is not limited; however, it is preferable that the thick portion 112 be thicker than the periphery 113 by 5% or more. That is, assuming that the thickness of the periphery 113 of the base-material layer 11 is $L_{113}$ (mm), the thickness of the sewn area 111 of the base-material layer 11 is $L_{111}$ (mm), the thickness of the thick portion 112 is $L_{112}$ (mm) ($L_{112}=L_{111}-L_{113}$) (see FIG. 8), the ratio of the thickness $L_{112}$ of the thick portion 112 to the thickness $L_{113}$ of the periphery 113 of the base-material layer 11 ($L_{112}/L_{113}$) is preferably ($L_{112}/L_{113}$)≤0.05. Since $L_{112}/L_{113}$ is 0.05 or more, superior density reduction and mechanical strength improvement of the area 111 to be sewn (the sewn area 111 after sewing) can be obtained. Therefore, the stitch pattern 13 can be formed where sewing is easy and mechanical strength is not lowered. The ratio ($L_{112}/L_{113}$) is more preferably 0.08≤($L_{112}/L_{113}$)≤1.5, further preferably 0.10≤($L_{112}/L_{113}$)≤1.0, and still more preferably 0.13≤($L_{112}/L_{113}$)≤0.9, particularly preferably 0.16≤($L_{112}/L_{113}$)≤0.8, and most preferably 0.18≤($L_{112}/L_{113}$)≤0.7.

In addition, the width of the thick portion 112 is not particularly limited, as long as the thick portion 112 includes an area which the thread 2 penetrates by sewing. For example, assuming that the fineness of the thread 2 used for sewing is S (dtex) and the width of the thick area (area 111 to be sewn) of the base-material layer 11 is $D_{111}$ (mm) (see FIG. 8), the ratio ($S/D_{111}$) is preferably 100 or more. The ratio ($S/D_{111}$) is more preferably 100≤($S/D_{111}$)≤800, further preferably 150≤($S/D_{111}$)≤600, and still more preferably 180≤($S/D_{111}$)≤500, particularly preferably 200≤($S/D_{111}$)≤450, and most preferably 250≤($S/D_{111}$) 400.

The sewn area 111 may protrude only on the one surface 11a of the base-material layer 11 to form the thick portion 112 or may protrude only on the opposite surface 11b of the base-material layer 11 to form the thick portion 112 (see FIG. 8), and furthermore, may protrude on both the one surface 11a and the opposite surface 11b of the base-material layer 11 to form the thick portion 112. Among them, it is preferable that the sewn area 111 protrude to be thick only on the opposite surface 11b of the base-material layer 11. In this case, flatness of the design surface 12a can be maintained more than in the case where the thick portion 112 is formed to protrude on the one surface 11a of the base-material layer 11.

Examples of the reinforcing fibers constituting the above-described base-material layer 11 include inorganic fibers (such as glass fibers) and organic fibers (natural fibers such as plant fibers and animal fibers). One kind of them may be used, or two or more kinds of them may be used in combination. Among the above fibers, organic fibers are preferable, furthermore natural fibers are preferable, and plant fibers are particularly preferable. The plant fiber is a fiber derived from a plant. Examples of the plant fiber include a fiber taken out of a plant and a fiber produced by processing the fiber. Examples of the plant fiber include a vein fiber, a bast fiber, a wooden fiber, and other plant fibers. One kind of them may be used, or two or more kinds of them may be used in combination.

Among them, examples of the vein fiber include abaca, sisal, and agave. In addition, examples of the bast fiber include flux, jute, hemp, kenaf, and ramie. Further, examples of the wooden fiber include plant fibers collected from a broad-leaf tree, a coniferous tree and the like. Other examples of the plant fiber include a coconut shell fiber, an oil palm empty fruit bunch fiber, a rice straw fiber, wheat straw fiber, bamboo fiber, and cotton. Among them, the vein fiber, the bast fiber, and other plant fibers are preferable.

The fiber length of the plant fiber is not particularly limited; however, the average fiber length is preferably 10 to 200 mm, more preferably 20 to 170 mm, particularly preferably 30 to 150 mm.

The fiber diameter of the plant fiber is not particularly limited; however, the average fiber diameter is preferably 0.01 to 2.5 mm, more preferably 0.1 to 2.0 mm, particularly preferably 0.3 to 1.5 mm.

Note that the above-described average fiber length is in accordance with JIS L1015, and is the average value of 200 single fibers taken out one by one randomly by the direct method, and put straight without being stretched. The fiber length of each single fiber was measured on a measuring stick. The average fiber diameter is measured using the total of 200 plant fibers used for measuring the average fiber length. That is, average fiber diameter is the average value of the values of fiber diameters at the center in the longitudinal direction of the plant fibers measured using an optical microscope.

The kind of the first thermoplastic resin which binds fiber materials is not particularly limited; however, a polyolefin resin, a polyester resin, a polystyrene resin, an acrylic resin, a polyamide resin, a polycarbonate resin, a polyacetal resin, an ABS resin and the like can be used. One kind of them may be used, or two or more kinds of them may be used in combination.

Examples of the polyester resin include polylactic acid, an aliphatic polyester resin, and an aromatic polyester resin. Examples of the aliphatic polyester resin include polycaprolactone and polybutylene succinate. Further, examples of the aromatic polyester resin include polyethylene terephthalate, polytrimethylene terephthalate, polybutylene terephthalate, and polyethylene naphthalate. In addition, examples of the acrylic resin include various resins obtained using methacrylate, acrylate, or the like.

Among the first thermoplastic resins, the polyolefin resin is preferable. Examples of the olefin monomer constituting the polyolefin resin include ethylene, propylene, 1-butene, 3-methyl-1-butene, 1-pentene, 3-methyl-1-pentene, 4-methyl-1-pentene, 1-hexene, and 1-octene. One kind of them may be used, or two or more kinds of them may be used in combination.

That is, examples of the polyolefin resin include polyethylene resins such as an ethylene homopolymer, an ethylene-1-butene copolymer, an ethylene-1-hexene copolymer, and an ethylene-4-methyl-1-pentene copolymer. In these polyethylene resins, 50% or more of the total number of constitutional units are units derived from ethylene. Furthermore, examples of the polyolefin resin include polypropylene resins such as a propylene homopolymer, a propylene-ethylene copolymer (a propylene-ethylene random copolymer, or the like), and a propylene-1-butene copolymer. In the above polypropylene resins, 50% or more of the total number of constitutional units are units derived from propylene.

The first thermoplastic resin contained in the present fiber board may be only a non-modified thermoplastic resin, but may also contain a modified thermoplastic resin by introducing a polar group. Examples of the polar group include a carboxylic acid anhydride group (—CO—O—OC—), a carboxylic acid group (—COOH), a carbonyl group (—CO—), a hydroxyl group (—OH), an amino group (—NH$_2$) a nitro group (—NO$_2$), and a nitrile group (—CN). One kind of them may be used, or two or more kinds of them may be used in combination.

The ratio of the reinforcing fibers and the first thermoplastic resin contained in the base-material layer 11 is not particularly limited. However, assuming that the total of the reinforcing fibers and the first thermoplastic resin contained in the base-material layer 11 is 100 mass %, the ratio of the reinforcing fibers can be set to 10 mass % or more and 90 mass % or less, preferably 15 mass % or more and 85 mass % or less, more preferably 15 mass % or more and 85 mass % or less, still more preferably 20 mass % or more and 80 mass or less, further more preferably 25 mass % or more and 75 mass % or less, particularly preferably 30 mass % or more 70 mass % or less, more particularly preferably 35 mass % or more and 65 mass % or less, and most preferably 40 mass % or more and 60 mass % or less.

The skin layer 12 is a layer joined to the one surface 11a of the base-material layer 11, and the outer surface of the skin layer 12 is a layer serving as the design surface 12a of the interior part 1 (see FIGS. 1A to 1D). That is, the skin layer 12 is a layer serving as a design surface of the interior part 1. In a case where the base-material layer 11 has an uneven shape, the skin layer 12 can be joined to the one surface 11a of the base-material layer 11 so as to follow the uneven shape.

The constitution of the skin layer 12 is not particularly limited, and may be made of only one layer, or may be made of two or more layers. In the case where the skin layer 12 is made of two or more layers, for example, the skin layer 12 may be made of a laminate including a surface layer (for example, synthetic leather or woven fabric) having the design surface 12a and a cushion layer (disposed on a non-design surface side of the skin layer 12). The cushion layer is a layer having elasticity. The cushion layer can give resilient feeling to touch sensation applied to the design surface 12a of the skin layer 12. The material constituting the cushion layer is not limited; however, soft polyurethane foam can be used, for example. In addition, another soft resin foam, a nonwoven fabric sheet, or the like may be used as long as the material has a sufficient cushioning property. In addition, a nonwoven fabric layer, a ventilation prevention layer and the like may be provided as necessary.

In addition to the above-described surface layer and cushion layer, another layer may be provided. As the other layer, various joining layers for joining layers such as the surface layer and the cushion layer can be interposed. Examples of the joining layer include an adhesive and a thermoplastic resin layer for joining. Examples of the joining layer further include a ventilation suppression layer for suppressing ventilation of the interior part 1 in the stacking direction. Only one of these layers may be used or two or more layers of these layers may be used in combination.

In addition, as described above, the interior part 1 includes the stitch pattern 13 formed on the design surface 12a of the skin layer 12 with the thread 2 sewn between the opposite surface 11b of the base-material layer 11 with respect to the one surface 11a and the design surface 12a of the skin layer 12 (see FIGS. 1A to 6). That is, the stitch pattern 13 is formed by the sewn thread 2 penetrating from the opposite surface 11b of the base-material layer 11 to the design surface 12a of the skin layer 12 (the one thread 2 may penetrate or two or more of the upper and lower different threads 2 may penetrate). Usually, the stitch pattern 13 is a thread line in which the sewn thread 2 appears on the design surface 12a. Examples of the stitch pattern 13 described above include line stitch, cross stitch, and embroidery (mark, logo, character, and the like). One kind of them may be used, or two or more kinds of them may be used in combination.

Among them, the line stitch is a line-shaped thread line, and may be a straight thread line or a curved thread line. In addition, the line stitch may be formed of one thread line or may be formed of two or more (plural) thread lines arranged in parallel such that the thread lines are viewed as a line shape as a whole.

The cross stitch is formed of a plurality of line stitches arranged so as to cross each other. The intersection angle between the line stitches is not limited. By using the cross stitch as described above, a quilting pattern can be formed, for example.

Embroidery is an aggregate of thread lines appearing on the design surface 12a, and is the stitch pattern 13 which forms a more complicated pattern than a line shape as a whole. That is, examples of the embroidery include the stitch patterns 13 such as a mark, a logo, a character, a figure, and a picture pattern.

Specifically, examples of the stitch pattern 13 include the line stitch and the embroidery formed on each part of a door trim of an automobile, various trim parts such as an armrest, an upper trim, a decorative panel, an ornament panel, a lower trim, a pocket (door trim pocket), and a quarter trim, a side garnish, a back door trim, and the like.

In the case of using the sewn area 111 provided with the thick portion 112 as described above, if the line stitch is provided as the stitch pattern 13, the thick portion 112 may be a protruding strip formed along the line stitch. That is, the base-material layer 11 may have a ridge (protruding strip) protruding on the opposite surface and line stitch as the stitch pattern 13 formed by sewing the thread 2 along a protrusion vertex of the ridge.

Similarly, in a case where cross stitch is formed as the stitch pattern 13, protruding strips formed along the cross stitch may be provided as the thick portion 112. That is, the base-material layer 11 may have ridges (protruding strips) protruding on the opposite surface 11b and arranged in a lattice shape, and include the cross stitch as the stitch pattern 13 formed along protrusion vertices of the ridges.

Furthermore, when embroidery is formed as the stitch pattern 13, the base-material layer 11 may include ridges (protruding strips) corresponding to and provided along the thread lines constituting the embroidery, as the thick portion 112. A protruding area (thick portion 112) may be provided so as to correspond to the area where embroidery is formed such that the entire embroidery is included. That is, in a predetermined area of the base-material layer 11, the thick portion 112 protruding on the opposite surface 11b of the base-material layer 11 and formed thicker than the other portion is provided, and the embroidery as the stitch pattern 13 may be provided on the thick portion 112.

Note that it is preferable to have a thick area corresponding to entirety of the line stitch, the cross stitch and the embroidery. However, it should be understood that the effect of the present invention is sufficiently obtained even in a mode where a thick area is not provided for part of the line stitch, cross stitch or the embroidery.

The thread 2 constituting the stitch pattern 13 may be any thread. That is, the thread 2 may be a spun yarn having a structure in which short fibers are twisted together, a filament yarn having a long fiber structure (which is a continuous long fiber), or both of them may be used. In addition, the thread 2 may be a monofilament, a multifilament, or a combination of them. Further, the thread 2 may be a twisted thread, a non-twisted thread, or a combination of them. In addition, as the thread 2, one thread may be used, or a plurality of threads may be used. In particular, in the interior part 1, it is possible to form the stitch pattern 13 by using an upper thread 21 and a lower thread 22. That is, by using the upper thread 21 and the lower thread 22, sewing can be performed so as to penetrate the opposite surface 11b of the base-material layer 11 and the design surface 12a of the skin layer 12 from above and below (see FIGS. 5 to 7). In addition, when the upper thread 21 and the lower thread 22 are used, identical threads may be used; however, different threads may be used. For example, a spun yarn may be used as the upper thread 21 and a filament yarn may be used as the lower thread 22.

The material constituting the thread 2 is not particularly limited. For example, polyester resins (polyethylene terephthalate, polybutylene terephthalate, and the like), polyamide resins (nylon 6, nylon 66, nylon 11, aramid, and the like), polyether ketone resins (polyether ether ketone, and the like), polyolefin resins (polyethylene, polypropylene, and the like), thermoplastic fluororesins (polyvinylidene fluoride, and the like), plant fibers (plant fiber similar to the reinforcing fiber constituting the base-material layer 11 described above), animal fibers (silk, animal hair, and the like), and the like can be used. One kind of them may be used, or two or more kinds of them may be used in combination.

In addition, as described above, in a case where the blocking portion 145 is formed at the hole inside 142 of the needle hole 14, the thread 2 may include a structural fiber (fiber which is not melted and decomposed when the second thermoplastic resin is melted, and can maintain the structure of the thread) and the second thermoplastic resin.

The second thermoplastic resin may be contained in the thread 2 in any way. For example, the thread 2 may contain a thermoplastic resin fiber made of the second thermoplastic resin together with the structural fiber. Specifically, an example of the thread 2 is the thread 2 obtained by twisting a plurality of structural fiber threads and a plurality of second thermoplastic resin fiber threads together. In this case, in the thread 2, the second thermoplastic resin fiber threads may be arranged so as to surround the outside of the structural fiber threads.

Further, the thread 2 may have a core-sheath structure. Specifically, the thread 2 having the core-sheath structure may be obtained by arranging a sheath made of the second thermoplastic resin on the outer periphery of one structural fiber thread as a core.

As described above, entirety of the thread 2 for forming the blocking portion 145 at the hole inside 142 of the needle hole 14 may be melted by heating when the blocking portion 145 at the hole inside 142 is formed. However, the thread 2 may be formed such that only part of the thread 2 made of the second thermoplastic resin is melted and the structural fiber is not melted or decomposed. In this mode, it is preferable to use a thermoplastic resin having a melting point higher than that of the second thermoplastic resin as the core.

Specifically, a thermoplastic resin having a melting point higher than 200° C. such as a polyester resin (such as polyethylene terephthalate having a melting point of more than 210° C.) or nylon can be used as the structural fiber and the core described above. In contrast, a thermoplastic resin having a melting point of 200° C. or lower such as polyethylene and low-melting-point polyester (crystalline polyethylene terephthalate having a melting point of 190° C. or lower) can be used as the second thermoplastic resin fiber and the sheath described above.

Furthermore, the thickness of the thread 2 constituting the stitch pattern 13 is not particularly limited. However, a thread with yarn count from 5 to 10 inclusive may be used. In addition, in a case where the upper thread 21 and the lower thread 22 are used as the thread 2, threads with an identical yarn count may be used or threads with different yarn counts may be used as the upper thread 21 and the lower thread 22. In the case of using the threads 2 with different yarn counts, it is preferable that the yarn count of the lower thread 22 be greater than the yarn count of the upper thread 21. Furthermore, the yarn count of the upper thread 21 is preferably from 5 to 7 inclusive, and the yarn count of the lower thread 22 is preferably from 8 to 10 inclusive.

Similarly, fineness of the thread 2 constituting the stitch pattern 13 is not limited. However, for example, fineness is preferably from 500 dtex to 1300 dtex inclusive, more preferably 570 dtex to 1250 dtex inclusive, and particularly preferably from 640 dtex to 1230 dtex inclusive.

In addition, as described above, in the case of forming the stitch pattern 13 by using the upper thread 21 and the lower thread 22, it is preferable to make the fineness of the upper thread 21 greater than the fineness of the lower thread 22. In this case, the fineness of the upper thread 21 is preferably from 850 dtex to 1300 dtex inclusive, more preferably from 900 dtex to 1250 dtex inclusive, and particularly preferably from 950 dtex to 1200 dtex inclusive. In contrast, the fineness of the lower thread 22 is preferably greater than or equal to 500 dtex and less than 850, more preferably from 550 dtex to 825 dtex inclusive, and particularly preferably from 600 dtex to 800 dtex inclusive.

In addition, in the case of using the upper thread 21 and the lower thread 22 as the thread 2 and using the thread containing the second thermoplastic resin as described above, a mode is possible where the second thermoplastic resin is not contained in the upper thread 21 and the second thermoplastic resin is contained only in the lower thread 22.

[2] Method for Manufacturing Interior Part

A method for manufacturing an interior part (first method) according to the present invention is a method for manufacturing the above-described interior part (1) and includes:

a heating step (PR1) of heating a fiber-reinforced board (11x) obtained by including the reinforcing fibers and the first thermoplastic resin and being compressed to soften the first thermoplastic resin;

a shaping step (PR2) of shaping the fiber-reinforced board (11x) in which the first thermoplastic resin is softened;

a laminate forming step (PR3) of forming a laminate (1x) including the base-material layer (11) which has been shaped and the skin layer (12) joined to the one surface (11a) of the base-material layer 11 by joining a skin layer (12x) to one surface of the fiber-reinforced board (11x) simultaneously with or after the shaping step (PR2);

a stitch pattern forming step (PR4) of forming the stitch pattern (13) by performing sewing between the opposite surface (11b) of the base-material layer (11) and the design surface (12a) of the skin layer (12); and a blocking step (PR5) of blocking the needle hole (14) formed by penetration of a sewing needle at least at one of the opening (141) of the needle hole (14) on the opposite surface (11b) of the base-material layer (11) and the hole inside (142) of the needle hole 14 (see FIGS. 9 to 12).

The above heating step (PR1) is a step of heating the fiber-reinforced board 11x to soften the first thermoplastic resin contained in the fiber-reinforced board 11x. The fiber-reinforced board 11x used in this step is a precursor that becomes the base-material layer 11 in the interior part 1. The fiber-reinforced board 11x is a plate-like body obtained by including the reinforcing fibers and the first thermoplastic resin and being compressed, and usually has a flat plate shape. The thickness (the thickness before the heating step) of the fiber-reinforced board 11x may be, for example, 1 mm or more and 10 mm or less.

The reinforcing fiber and the first thermoplastic resin are as described above. In the heating step PR1, the fiber-reinforced board 11x; may be heated in any way. However, it is preferable to heat the fiber-reinforced board 11x while applying pressure so that compression is not excessively released by heating. From such a viewpoint, it is preferable to heat the fiber-reinforced board 11x by using a hot press machine 51 (see FIGS. 9 and 10).

Heating conditions and the like of the fiber-reinforced board 11x can be appropriately set depending on the constituent material and the like of the fiber-reinforced board 11x. Specifically, for example, in a case where the contained first thermoplastic resin is polyolefin, it is preferable to heat the fiber-reinforced board 11x to 70° C. or higher (temperature inside the fiber reinforced board 11x). The heating temperature is preferably from 80° C. to 150° C. inclusive, more preferably from 85° C. to 130° C. inclusive, and particularly preferably from 90° C. to 120° C. inclusive.

The above shaping step (PR2) is a step of shaping the fiber-reinforced board 11x in which the first thermoplastic resin is softened.

Figure 9:
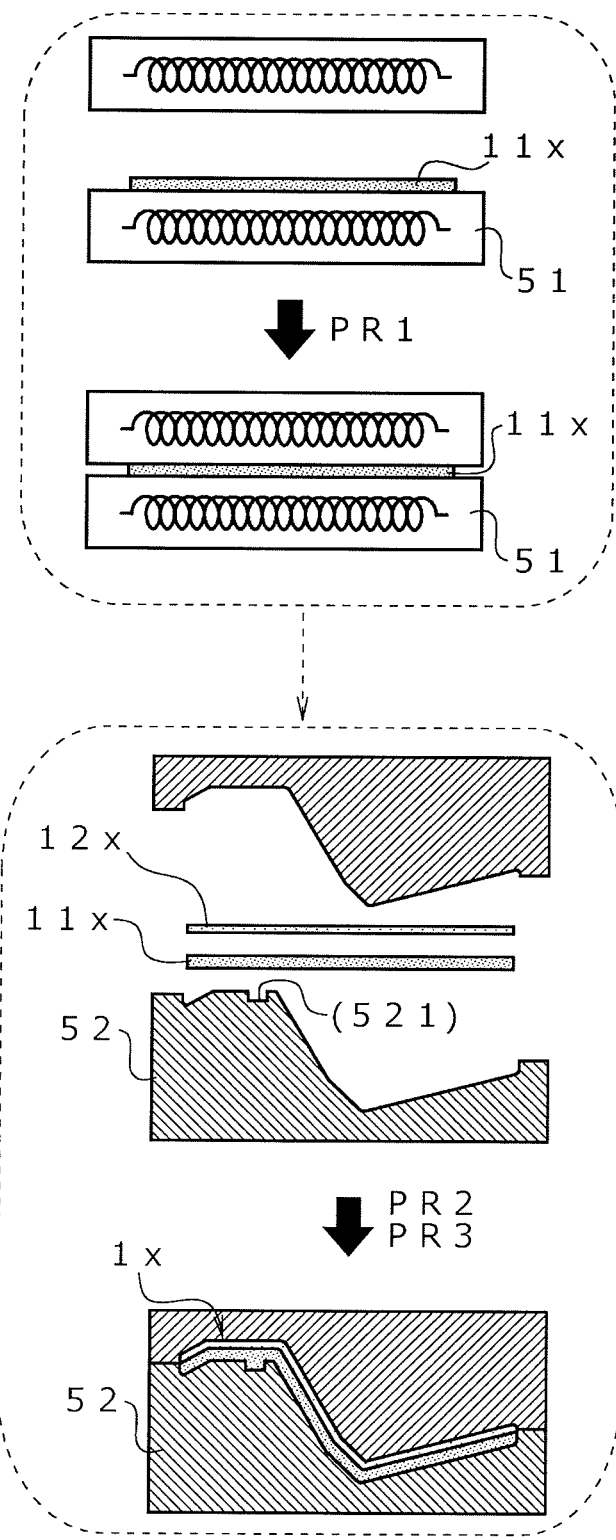
FIG. 9 is an explanatory view schematically illustrating an example of the method for manufacturing the interior part according to the present invention.
Figure 10:
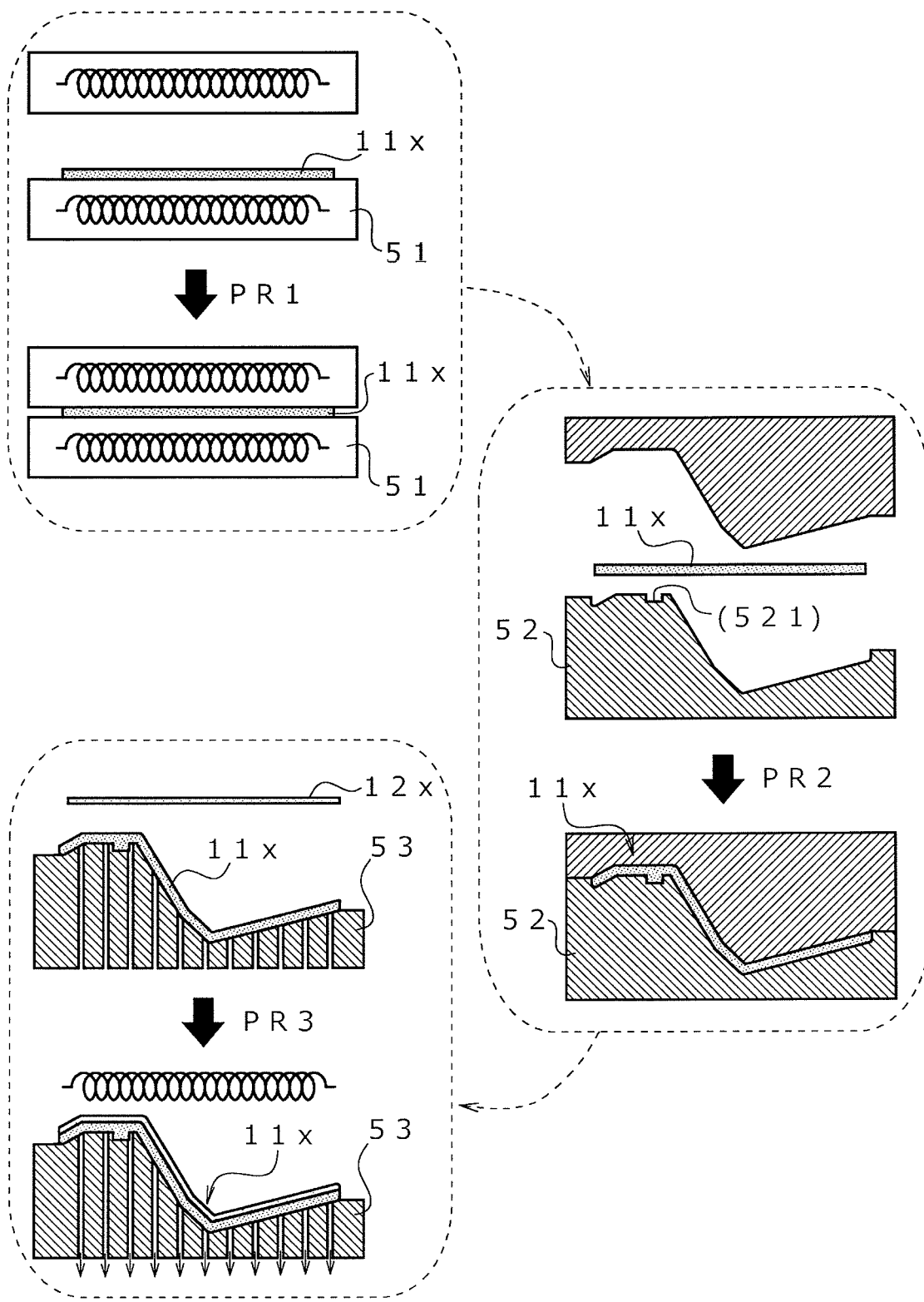
FIG. 10 is an explanatory view schematically illustrating another example of the method for manufacturing the interior part according to the present invention.

This step can be carried out by using, for example, a cold press machine 52 (see FIGS. 9 and 10). Shaping thickness can be controlled by changing clearance of a cavity. That is, in an area where the clearance is great, since restraint of the reinforcing fibers by the first thermoplastic resin is released more, compression is released and the fiber reinforced board 11x can be made thick.

Molding conditions upon cold press molding are not particularly limited. However, for example, mold temperature upon molding can be set from 20° C. to 60° C. inclusive. In addition, mold clamping time can be set from 30 seconds to 60 seconds inclusive.

Note that the area 111 to be sewn in the laminate 1x before the stitch pattern 13 is provided and the sewn area 111 in the interior part 1 after the stitch pattern 13 is provided differ from each other only in the presence or absence of the stitch pattern 13, and shapes, widths, thicknesses and the like of the above areas 111 are usually identical regardless of the presence or absence of the stitch pattern 13. Accordingly, as a mode of the area 111 to be sewn, the above description of the sewn area 111 can be applied as it is.

The above laminate forming step (PR3) is a step of forming the laminate 1x including the base-material layer 11 obtained by shaping the fiber-reinforced board 11x and the skin layer 12 joined to the one surface 11a of the base-material layer 11, by joining the skin layer 12x to one surface of the fiber-reinforced board 11x simultaneously with or after the shaping step (PR2). The skin layer 12x to be joined in the laminate forming step PR3 is a precursor to be the skin layer 12 of the interior part 1, and is a precursor skin layer 12x.

As illustrated in FIG. 9, this laminate forming step PR3 can be carried out simultaneously with the shaping step PR2. That is, by introducing the precursor skin layer 12x together with the heated fiber-reinforced board 11x into the cold press machine 52 and collectively pressing them, the precursor skin layer 12x can be joined to the one surface of the fiber-reinforced board 11x simultaneously with shaping of the fiber-reinforced board 11x.

In addition, as illustrated in FIG. 10, this laminate forming step PR3 can be carried out separately from the shaping step PR2. That is, the shaped fiber-reinforced board 11x is set on a suction table 53, the precursor skin layer 12x is sucked to the one surface of the fiber-reinforced board 11x by sucking the opposite surface of the shaped fiber-reinforced board 11x, and the precursor skin layer 12x is heated. Thus, the precursor skin layer 12x can be joined to the shaped fiber-reinforced board 11x. Since the fiber-reinforced board 11x has porosity as described above, suction as described above is possible.

Upon joining, in a case where a thermoplastic resin is contained in each of the fiber-reinforced board 11x and the precursor skin layer 12x, the fiber-reinforced board 11x and the precursor skin layer 12x can be joined to each other with the thermoplastic resin softened and melted. An adhesive can be used alone or together with the thermoplastic resin.

Figure 11:
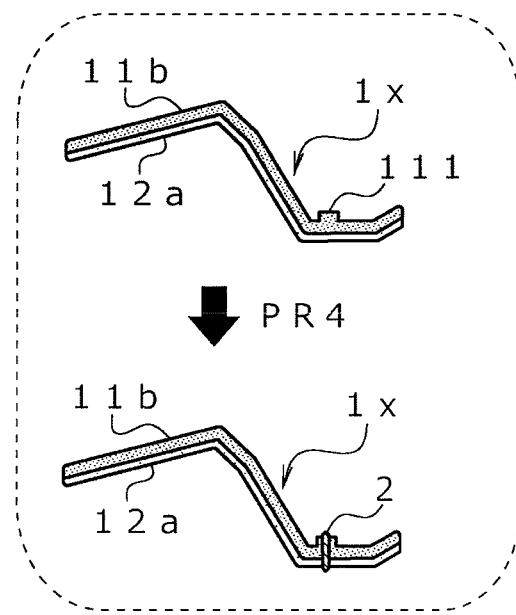
FIG. 11 is an explanatory view schematically illustrating an example of the method for manufacturing the interior part according to the present invention.
Figure 12:
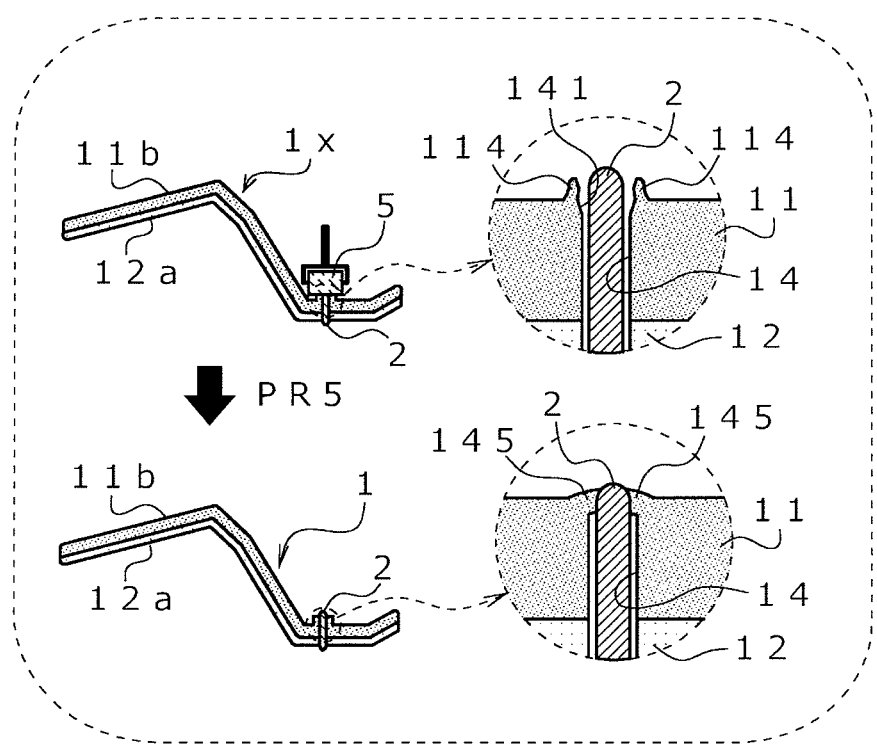
FIG. 12 is an explanatory view schematically illustrating an example of the method for manufacturing the interior part according to the present invention.

The stitch pattern forming step (PR4) is a step of performing sewing between the opposite surface 11b of the base-material layer 11 and the design surface 12a of the skin layer 12 so that the sewing needle penetrates the area 111 to be sewn to form the stitch pattern 13 (see FIG. 11). This step is not particularly limited, and can be carried out using a conventionally known method.

The blocking step (PR5) is a step of blocking at least one of the opening 141 of the needle hole 14 formed by penetration of the sewing needle, the opening 141 being located on the opposite surface 11b of the base-material layer 11, and the hole inside 142 of the needle hole 14.

The blocking step (PR5) may be carried out in any way. However, in the case of obtaining the interior part 1 including the blocking portion 145 formed of the burr 114 formed upon sewing and buried into the opening 141 of the needle hole 14 as described above, the blocking step (PR5) may be a step (second method) of heating and softening the burr 114 formed on the opposite surface 11b of the base-material layer 11 by the sewing needle penetrating the base-material layer 11 in the stitch pattern forming step PR4, and burying the burr 114 into the opening 141 of needle hole 14 (see FIGS. 1C, 3C, and 12).

In this case, the burr 114 heated and softened can be buried into the opening 141 by pressing the burr 114 with a pressing roller 5. The pressing roller 5 may be moved only in one direction. However, by reciprocating the pressing roller 5 along the area where the needle holes 14 are arranged in a row on the opposite surface 11b, the burr 114 can be more reliably buried into the needle hole 14.

In addition, upon heating of the burr 114, the entire base-material layer 11 may be heated. However, since only the burr 114 needs to be softened, it is possible to heat the base-material layer 11 only from an opposite surface 11b side of the base-material layer 11. Heating conditions and the like are identical to those in the heating step PR1.

The blocking step (PR5) may be carried out in any way. However, in a case of obtaining the interior part 1 including the blocking portion 145 formed of the thread 2 including the second thermoplastic resin and melted and solidified at the hole inside 142 of the needle hole 14 as described above, the blocking step (PR5) may include a step (third method) of melting and solidifying the thread 2 including the second thermoplastic resin at the hole inside 142 of the needle hole 14 (see FIGS. 1D and 3D).

Note that FIGS. 9 and 10 illustrate the cold press machine 52 in which a recess 521 is provided in the cavity; however, in the present methods (first to third methods), a cold press machine 52 having no recess 521 in a cavity may also be used for manufacture of the interior part 1.

Furthermore, in the case of obtaining the interior part 1 in which the sewn area 111 of the base-material layer 11 includes the thick portion 112 thicker than the periphery 113 as described above, the interior part 1 of the present invention can be obtained by a method (fourth method) for manufacturing an interior part according to the present invention. That is, the interior part 1 can be obtained by a method for manufacturing the interior part 1, the method including:

a heating step PR1;

a shaping step PR2 of shaping the fiber-reinforced board 11x in which the first thermoplastic resin is softened and forming the area 111 to be sewn thicker than the periphery 113 by releasing compression;

a laminate forming step PR3 of forming the laminate 1x including the base-material layer 11 which has been shaped and the skin layer 12 joined to the one surface 11a of the base-material layer 11 by joining the skin layer 12x on the one surface of the fiber-reinforced board 11x simultaneously with or after the shaping step PR2;

a stitch pattern forming step PR4 of forming the stitch pattern 13 by performing sewing between the opposite surface 11b of the base-material layer 11 and the design surface 12a of the skin layer 12 such that the sewing needle penetrates the area 111 to be sewn; and a blocking step PR5 of blocking the needle hole 14 formed by penetration of the sewing needle at least at one of the opening 141 on the opposite surface 11b of the base-material layer 11 and the hole inside 142 of the needle hole 14.

In this case, the shaping step PR2 can be performed using the cold press machine 52 (see FIGS. 9 and 10) in the same manner as described above. Shaping thickness can be controlled by changing clearance of a cavity. Specifically, in an area of the cavity corresponding to the area 111 to be sewn, the recess 521 having greater clearance than that of the area corresponding to the periphery 113 of the base-material layer 11 is provided, and cold pressing is performed. Therefore, it is possible to form the area 111 to be sewn thicker than the periphery 113. That is, in an area where the clearance is greater, since restraint of the reinforcing fiber by the thermoplastic resin is released more than in the periphery 113, compression is released and the area 111 to be sewn thicker than the periphery can be formed. Due to this action, the area 111 to be sewn can be made into an area having a higher mechanical strength than that of the periphery 113, even though the area 111 to be sewn is a low-density area which the sewing needle easily penetrates.

Molding conditions upon cold press molding can be identical to those in the first method. Note that the area 111 to be sewn in the laminate 1x before the stitch pattern 13 is provided and the sewn area 111 in the interior part 1 after the stitch pattern 13 is provided differ from each other only in the presence or absence of the stitch pattern 13, and shapes, widths, thicknesses and the like of the above areas 111 are usually identical regardless of the presence or absence of the stitch pattern 13. Accordingly, as a mode of the area 111 to be sewn, the above description of the sewn area 111 can be applied as it is.

The laminate forming step PR3 can be performed similarly to that in the first method.

The stitch pattern forming step PR4 is a step of performing sewing between the opposite surface 11b of the base-material layer 11 and the design surface 12a of the skin layer 12 so that the sewing needle penetrates the area 111 to be sewn to form the stitch pattern 13 (see FIG. 11). This step is not particularly limited, and can be carried out using a conventionally known method. The material constituting the thread 2 is not limited, and for example, a polyester yarn, a nylon yarn, or the like can be appropriately used.

In this step, sewing is performed by making the sewing needle penetrate the area 111 to be sewn which is thicker than the periphery 113 and thus whose density is lowered. Therefore, it is possible to prevent reduction of mechanical strength of the portion where the stitch pattern 13 is formed while achieving ease of sewing and suppression of wear of the sewing needle.

As described above, the sewn area 111 of the interior part 1 can be formed to be thick and protrude only on the opposite surface 11b of the base-material layer 11. In order to form the sewn area 111 as described above, in the present manufacturing method, the fiber-reinforced board 11x can be shaped so that the area 111 to be sewn is thick and protrudes only on the opposite surface 11b of the base-material layer 11 in the shaping step.

In addition, in the interior part 1, the stitch pattern 13 is line stitch, and the sewn area 111 can be formed to have a thick line shape along the line stitch. Therefore, it is possible to form the area 111 to be sewn having a thick line shape in the present manufacturing method.

Furthermore, in the interior part 1, the sewn area 111 can be made thicker by 5% or more than the periphery. Therefore, the area 111 to be sewn can be made thicker by 5% or more than the periphery 113 in the present manufacturing method.

In addition, the blocking step PR5 can be performed similarly to that in the first method.

EXAMPLES

Hereinafter, the present invention will be specifically described with reference to Examples.
[1] Preparation of Test Piece Reinforcing fibers and thermoplastic resin fibers were mixed at a mass ratio of 50:50 and then were compressed to prepare a fiber-reinforced board 11x having a thickness of 2 mm {the reinforcing fiber was kenaf fiber having an average fiber length of 70 mm, and the thermoplastic resin fiber was a synthetic fiber (6 dtex, average fiber length 51 mm) obtained by spinning polypropylene (mixed resin, unmodified: modified=95 mass %: 5 mass %)}.

This fiber-reinforced board 11x was clamped, heated, and pressed by a hot press machine 51 (hydraulic press device equipped with a heater) to obtain the fiber reinforced board 11x heated to 210° C. (heating step PR1).

Next, the fiber reinforced board 11x in a heated state was supplied to a cold press machine 52 and molded for 30 to 60 seconds at 20 to 60° C. Thus, as illustrated in FIG. 9, the fiber-reinforced board 11x was shaped into an uneven shape, and the skin layer 12 was joined to one surface of the fiber-reinforced board 11x to obtain a laminate 1x(1) (shaping step PR2 and laminate forming step PR3).

At that time, by adjusting depth of a groove provided in a mold, a line-shaped area 111 to be sewn (width $D_{111}$=1 cm) was provided on the opposite surface 11b of the base-material layer 11. The following two types of laminates 1x(2) and (3) differing from each other in thickness of a thick portion 112 were also formed.

Laminate 1x(1): thickness of periphery 113: 2.5 mm, thickness of area 111 to be sewn: 2.5 mm
Laminate 1x(2): thickness of periphery 113: 2.5 mm, thickness of area 111 to be sewn: 3.0 mm
Laminate 1x(3): thickness of periphery 113: 2.5 mm, thickness of area 111 to be sewn: 3.5 mm Note that density of the area of the periphery 113 (thickness 2.5 mm) of each of the laminates 1x(1) to (3) is 0.60 g/cm³.

Line stitch was formed by sewing at a center portion in the width of the area 111 to be sewn of each of the laminates 1x(1) to (3) obtained so far with a polyester yarn having fineness of 1180 dtex (yarn count 5) used as an upper thread 21 and a polyester yarn having fineness of 740 dtex (yarn count 8) used as a lower thread 22. Thus, four kinds of interior parts 1 of Examples 1 to 3 and Comparative Example 2 were obtained (sewing needle with needle number 24 was used). Further, an interior part of Comparative Example 1 (that is, not provided with the stitch pattern 13) in which sewing was not performed was obtained.

At that time, in Comparative Example 2 and Example 1, since the sewing needle was overheated and smoke was generated when sewing was performed about 2 to 3 cm, sewing was completed while the sewing needle is allowed to cool. In contrast, in Example 2 and Example 3, sewing was performed without any problems from beginning to end.

An area having line stitch (stitch pattern 13) of each of the obtained interior parts 1 (Examples 1 to 3, Comparative Examples 1 and 2) (equivalent area in Comparative Example 1) was cut into a test piece which is a rectangle of 150 mm×50 mm such that the line stitch passes through the center in the longitudinal direction (the line stitch is arranged along the longitudinal direction). Subsequently, the maximal bending load was measured according to JIS K7171. In this measurement, while the test piece was supported at two fulcrums (radius of curvature 5.0 mm) with a distance between the fulcrums of 100 mm, measurement was performed by applying a load to a point of application (radius of curvature 3.2 mm) located at the center between the fulcrums, at the speed of 50 mm/min. The results are illustrated in Table 1.

lowered to 44N. However, the maximal bending load of Example 1 in which sewing was performed to form the stitch pattern 13 and hole filling was performed was 52.4 N, which was greater than that before sewing.

Furthermore, it can be seen that in Examples 2 to 3 in which the thick portions were formed and ease of sewing was secured, further higher maximal bending loads, that is, 61.2 and 70.2 N were obtained, respectively.

The foregoing examples are for illustrative purposes only and are not to be construed as limiting the present invention. While the present invention has been described by way of examples of typical embodiments, it is understood that the language used in the description and illustration of the present invention is to be regarded as illustrative and not restrictive. Modifications within the scope of the appended claims can be made without departing from the scope or spirit of the present invention in its form as detailed herein. Although reference has been made herein to specific structures, materials and examples in the detailed description of the present invention, it is not intended to limit the present invention to the disclosure herein, but rather, it is to be understood that the present invention shall cover all functionally equivalent structures, methods and uses within the scope of the appended claims.

The interior part and the method for manufacturing the same (regarding automobiles, railway vehicles, and the like) of the present invention are widely used as an interior part and a method for manufacturing the same in various fields such as vehicles, aircrafts, ships, buildings and the like.

Specific examples include: automobile trim parts such as a door trim, an armrest, an upper trim, a decorative panel, an ornament panel, a lower trim, a pocket (door trim pocket), a quarter trim, and the like; a pillar garnish; a cowl side garnish (cowl side trim); seat parts such as a side airbag peripheral part; instrument panel parts such as a center cluster, a resistor, a center box (door), a glove door and an airbag peripheral part; a center console; an overhead console; a sun visor; a deck board (luggage board), an undertray; a package tray; a CRS cover; a seat side garnish; an assist grip; a passing light lever, and the like.

What is claimed is:

1. An interior part comprising:
   a base-material layer and a skin layer which is joined to one surface of the base-material layer,
   the base-material layer including reinforcing fibers, and a first thermoplastic resin binding the reinforcing fibers together,

TABLE 1

| | Sewing (Stitch Pattern) | Hole Filling | Thickness of Periphery (mm) | Thickness of Area to be Sewn (mm) | Thick Portion (mm) | Density of Area to be Sewn (g/cm³) | Maximal Bending Load (N) |
|---|---|---|---|---|---|---|---|
| Comparative Example | 1 | Absent | Absent | 2.5 | 2.5 | 0 | (0.60) | 46.0 |
| | 2 | Present | Absent | 2.5 | 2.5 | 0 | (0.60) | 44.0 |
| Example | 1 | Present | Present | 2.5 | 2.5 | 0 | (0.60) | 52.4 |
| | 2 | Present | Present | 2.5 | 3.0 | 0.5 | 0.50 | 61.2 |
| | 3 | Present | Present | 2.5 | 3.5 | 1.0 | 0.43 | 70.2 |

From the results of Table 1, it can be seen that it is possible to provide the interior part 1 capable of having a high mechanical strength while having the stitch pattern 13 penetrating the base-material layer 11.

That is, it can be seen that while the maximal bending load of Comparative Example 1 without the stitch pattern 13 was 46N, the maximal bending load of Comparative Example 2 in which the stitch pattern 13 was formed by sewing was wherein a thread sewn between an opposite surface of the base-material layer with respect to the one surface and a design surface of the skin layer forms a stitch pattern provided on the design surface, a needle hole through which the thread is inserted and which is formed in the base-material layer is blocked at least at one of an opening of the needle hole on the opposite surface of the base-material layer and a hole inside of the needle hole, and a sewn area of the base-material layer is thicker than a periphery of the sewn area, the sewn area being an area of the base-material layer that is disposed between the thread and the one surface.

2. The interior part according to claim 1 wherein
the needle hole is blocked at the opening on the opposite surface of the base-material layer, and a blocking structure which blocks the needle hole is obtained by burying a burr into the opening of the needle hole, the burr being generated on the opposite surface of the base-material layer when the sewing needle penetrates the base-material layer upon sewing.

3. A method for manufacturing the interior part according to claim 2, the method comprising:

heating a fiber-reinforced board obtained by including the reinforcing fibers and the first thermoplastic resin and being compressed to soften the first thermoplastic resin;

shaping the fiber-reinforced board in which the first thermoplastic resin is softened;

forming a laminate which includes the base-material layer which has been shaped and the skin layer joined to the one surface of the base-material layer by joining the skin layer to one surface of the fiber-reinforced board at one of timings simultaneous with and after the shaping;

forming the stitch pattern by performing sewing between the opposite surface of the base-material layer and the design surface of the skin layer; and blocking the needle hole formed by penetration of the sewing needle at the opening on the opposite surface of the base-material layer, wherein in the blocking, a burr is buried into the opening of the needle hole by heating and softening the burr generated on the opposite surface of the base-material layer when the sewing needle penetrates the base-material layer in the forming the stitch pattern.

4. The interior part according to claim 1, wherein the thread includes a second thermoplastic resin, the needle hole is blocked at the hole inside, and a blocking structure portion which blocks the needle hole is obtained by melting and solidifying the second thermoplastic resin at the hole inside.

5. A method for manufacturing the interior part according to claim 4, the method comprising:

heating a fiber-reinforced board obtained by including the reinforcing fibers and the first thermoplastic resin and being compressed to soften the first thermoplastic resin;

shaping the fiber-reinforced board in which the first thermoplastic resin is softened;

forming a laminate which includes the base-material layer which has been shaped and the skin layer joined to the one surface of the base-material layer by joining the skin layer to one surface of the fiber-reinforced board at one of timings simultaneous with and after the shaping;

forming a stitch pattern by performing sewing with the thread including the second thermoplastic resin between the opposite surface of the base-material layer and the design surface of the skin layer; and blocking the hole inside of the needle hole formed by penetration of a sewing needle, wherein in the blocking, the second thermoplastic resin is melted and solidified at the hole inside.

6. A method for manufacturing the interior part according to claim 1, the method comprising:

heating a fiber-reinforced board obtained by including the reinforcing fibers and the first thermoplastic resin and being compressed to soften the first thermoplastic resin;

shaping the fiber-reinforced board in which the first thermoplastic resin is softened;

forming a laminate which includes the base-material layer which has been shaped and the skin layer joined to the one surface of the base-material layer by joining the skin layer to one surface of the fiber-reinforced board at one of timings simultaneous with and after the shaping;

forming the stitch pattern by performing sewing between the opposite surface of the base-material layer and the design surface of the skin layer; and blocking the needle hole formed by penetration of a sewing needle at least at one of the opening of the needle hole on the opposite surface of the base-material layer and the hole inside of the needle hole.

7. A method for manufacturing the interior part according to claim 1, the method comprising:

heating a fiber-reinforced board obtained by including the reinforcing fibers and the first thermoplastic resin and being compressed to soften the first thermoplastic resin;

shaping the fiber-reinforced board in which the first thermoplastic resin is softened and forming an area to be sewn thicker than a periphery of the area to be sewn by releasing compression;

forming a laminate which includes the base-material layer which has been shaped and the skin layer joined to the one surface of the base-material layer by joining the skin layer to one surface of the fiber-reinforced board at one of timings simultaneous with and after the shaping;

forming a stitch pattern by performing sewing between the opposite surface of the base-material layer and the design surface of the skin layer such that a sewing needle penetrates the area to be sewn; and blocking the needle hole formed by penetration of the sewing needle at least at one of the opening of the needle hole on the opposite surface of the base-material layer and the hole inside of the needle hole.

8. The interior part according to claim 1, wherein a density of the base-material layer at the sewn area is less than a density of the base-material layer at the periphery of the sewn area.

9. The interior part according to claim 8, wherein the density of the base-material layer at the sewn area is X, the density of the base-material layer at the periphery of the sewn area is Y, and a ratio X/Y satisfies a relationship $0.50 \leq X/Y \leq 0.95$.

* * * * *